(12) United States Patent
Bahmata et al.

(10) Patent No.: US 11,542,994 B2
(45) Date of Patent: Jan. 3, 2023

(54) BRAKE SYSTEM WITH SUPPORT STRUCTURE FOR MOVING BODY

(71) Applicant: AKEBONO BRAKE INDUSTRY CO., LTD., Tokyo (JP)

(72) Inventors: Aurelian Bahmata, South Lyon, MI (US); Phil Nathanael Jedele, Ypsilanti, MI (US); Swanand Milind Velankar, Farmington Hills, MI (US)

(73) Assignee: AKEBONO BRAKE INDUSTRY CO., LTD, Tokyo (JP)

( * ) Notice: Subject to any disclaimer, the term of this patent is extended or adjusted under 35 U.S.C. 154(b) by 134 days.

(21) Appl. No.: 17/029,251

(22) Filed: Sep. 23, 2020

(65) Prior Publication Data
US 2022/0090641 A1    Mar. 24, 2022

(51) Int. Cl.
| | |
|---|---|
| *F16D 65/14* | (2006.01) |
| *F16D 55/228* | (2006.01) |
| *F16D 65/00* | (2006.01) |
| *F16D 65/12* | (2006.01) |
| *F16D 65/095* | (2006.01) |
| *F16D 55/00* | (2006.01) |

(52) U.S. Cl.
CPC ....... *F16D 55/228* (2013.01); *F16D 65/0056* (2013.01); *F16D 65/0068* (2013.01); *F16D 65/095* (2013.01); *F16D 65/12* (2013.01); *F16D 2055/0008* (2013.01); *F16D 2055/0016* (2013.01)

(58) Field of Classification Search
CPC . F16D 55/225–228; F16D 65/14; F16D 65/18
USPC .......................... 188/72.3, 73, 39–73.42, 370
See application file for complete search history.

(56) References Cited

U.S. PATENT DOCUMENTS

| | | | |
|---|---|---|---|
| 4,335,806 A | 6/1982 | Lüpertz | |
| 4,611,693 A | 9/1986 | Wang | |
| 10,119,582 B2* | 11/2018 | Noguchi | ............... F16D 55/226 |
| 10,544,843 B2* | 1/2020 | Thomas | ................. F16D 65/18 |
| 2018/0058524 A1* | 3/2018 | Suzuki | ................. F16D 55/226 |
| 2018/0245645 A1* | 8/2018 | Thomas | ................. F16D 65/18 |
| 2019/0383336 A1* | 12/2019 | Noguchi | ............... F16D 55/227 |
| 2021/0348663 A1* | 11/2021 | Lou | ...................... B60T 13/741 |

* cited by examiner

*Primary Examiner* — Christopher P Schwartz
(74) *Attorney, Agent, or Firm* — The Dobrusin Law Firm, P.C.

(57) ABSTRACT

A brake system that includes a fixed brake system, a sliding brake system, and a support structure. The fixed brake system has an inboard side and an outboard side and being operable to move an inboard brake pad and/or an outboard brake pad against a brake rotor to generate a first clamping force. The sliding brake system being operable to move relative to the fixed brake system and to move the inboard brake pad and/or the outboard brake pad against the brake rotor to generate a second clamping force. The support structure providing a sliding contact between the sliding brake system and the fixed brake system during movement of the sliding brake system relative to the fixed brake while generating or releasing the second clamping force. The support structure is located in a region of the outboard side of the fixed brake system.

20 Claims, 5 Drawing Sheets

BRAKE SYSTEM WITH SUPPORT STRUCTURE FOR MOVING BODY

FIELD

These teachings relate to a brake system; a method of applying and releasing a clamping force with a brake system; and to a brake system that includes a support structure and a moving body that is in sliding contact with the support structure.

BACKGROUND

An opposed piston brake system includes one or more brake pistons and one or more brake pads located on each side of a brake rotor. During a brake apply, the opposing brake pistons are moved towards one another, which moves the opposing brake pads into contact with both sides of a brake rotor to create a clamping force.

A sliding brake system includes a movable body and one or more brake pistons located on one side of a brake rotor. During a brake apply, movement of the one or more brake pistons causes a brake pad to be moved against one side of a brake rotor. A reaction force is generated, causing the movable body to move an opposing brake pad against an opposite side of the brake rotor to create a clamping force.

It may be desirable to have a brake system that combines structure and function of an opposed piston brake system with the structure and function of a sliding brake system. It may be desirable to have a brake system, where the structure of the opposed piston brake system is used to create a clamping force during a first braking operation, and the structure of the sliding brake system is used to create a clamping force during another braking operation. In some configurations, it may be desirable to have the structure of the opposed piston brake system and the structure of the sliding brake system create a clamping force during the same braking operation. It may be desirable to have a brake system that includes a support structure for supporting the moving body during creation and/or release of the clamping force. It may be desirable to have a sliding brake system that includes a support structure for supporting the moving body during creation and/or release of the clamping force.

SUMMARY

These teachings provide a brake system that combines the structure and function of an opposed piston brake system and the structure and function of a sliding brake system. The structure of the opposed piston brake system may be used to create a clamping force during a service brake apply, and the structure of the sliding brake system may be used to create a clamping force during a parking brake apply, or vice versa. In some configurations, the structure of the opposed piston brake system and the structure of the sliding brake system can be used to create a clamping force during the same braking operation and at the same time (i.e., simultaneously). In some configurations, the structure of the opposed piston brake system and the structure of the sliding brake system can be used to create a clamping force during the same braking operation, but sequentially (i.e., one after another). In other words, during a braking operation (service and/or braking), the clamping force may be generated first by the opposed piston structure, then the sliding piston structure, then the opposed piston structure, and so on until the clamping force is achieved. The alternating of the brake systems may occur any number of times (i.e., one or more time, two or more times, etc.). In other configurations, the alternating may begin with the structure of the sliding structure followed by the opposed piston structure. The brake system includes a support structure for supporting the moving body during creation and/or release of the clamping force.

These teachings provide a sliding brake system that includes a support structure for supporting the moving body during creation and/or release of the clamping force.

A brake system is provided that includes a fixed brake system, a sliding brake system, and a support structure. The fixed brake system has an inboard side and an outboard side and is operable to move at least one inboard brake pad (i.e., one or more) and/or at least one outboard brake pad (i.e., one or more) against a brake rotor to generate a first clamping force. The sliding brake system is operable to move relative to the fixed brake system and to move the inboard brake pad and/or the outboard brake pad against the brake rotor to generate a second clamping force. The support structure provides a sliding contact between the sliding brake system and the fixed brake system during movement of the sliding brake system relative to the fixed brake while generating or releasing the second clamping force. The support structure is located in a region of the outboard side of the fixed brake system. However, in certain configurations, the support structure may be located in a region of the inboard side of the brake system. In certain configurations, the support structure may be located in a region of the outboard and inboard side of the brake system. In some configurations, the one or more support structures may be located at leading end of the brake caliper, the trailing end of the brake caliper, in a region anywhere between the leading and trailing end, or a combination thereof. The support structure may be located on a top side of the brake caliper in a region of the bridge or sliding member), on a bottom side of the brake caliper, at a front end of the caliper, at a rear end of the caliper, or a combination thereof. In some configurations, the sliding structure may be a separate structure that is fixed to the vehicle frame or knuckle.

A brake system is provided that includes a brake pad; a sliding portion operable to move the brake pad against a braking disc to generate a first clamping force; and a supporting structure. The sliding portion is in sliding contact with the supporting structure while moving the brake pad against the braking disc. The supporting structure is located in a region of an outboard side of the brake system. However, in certain configurations, the support structure may be located in a region of the inboard side of the brake system.

The brake system according to these teachings has one or more inboard brake pads and one or more outboard brake pads. Advantageously, the sliding system and the fixed system is configured to move the same brake pad during any of the braking operations. For example, the during a service brake apply, the fixed system may be operable to move the inboard and outboard brake pads, and then during a parking brake operation, the sliding system is operable to move the same inboard and outboard brake pads, or vice versa. In other words, the brake system according to these teachings does not rely upon separate brake pads for service braking and separate brake pads for parking braking. This advantageously reduces weight, cost, assembly time, service time, and/or size of the brake system. By providing one or more support structures to support the moving or sliding part during a braking operation, risk of the moving or sliding part cocking or pulling the brake pad at an angle is reduced.

DETAILED DESCRIPTION

The teachings provide a brake system (which may also be referred to herein as a brake assembly). The brake system may function to create a clamping force to carry out a service brake operation (i.e., a brake that is applied to decelerate or stop a vehicle during normal driving operation). The brake system may function to create a clamping force carry out a service brake operation (i.e., a brake that is applied when the vehicle is in park or when an emergency stop must be performed). Preferably the brake system may carry out both the service brake operation and the parking brake operation.

The brake system may comprise a fixed brake system, a sliding brake system, or both. The fixed brake system and the sliding brake system may be integrated or combined together into a common system referred to herein as a brake system. In other words, the brake system may comprise a common brake caliper with the features of a sliding brake system and the features of a fixed brake system thereon. It is understood that certain elements or features of the brake system referred to herein as being part of the brake system may also, or may instead, be part of the fixed brake system, the sliding brake system, or a combination thereof. For example, this disclosure states: "The brake system 10 includes an inboard brake pad 20 and an outboard brake pad 22." This means that the brake system 10, the fixed brake system 12, the sliding brake system 14, or all three systems 10, 12, 14 may include an inboard brake pad 20 and an outboard brake pad 22.

Both of the fixed brake system and the sliding brake system may operate together or at the same time during one or more braking operations (i.e., a service brake operation and/or a parking brake operation). In some configurations, only the sliding brake system may operate during a parking brake operation. In some configurations, only the sliding brake may operate during the service brake operation. In some configurations, only the fixed brake system operates during the parking brake operation. In some configurations, only the fixed brake system operates during the service brake operation.

The brake system may comprise a fixed brake system. The fixed brake system may function to decelerate a vehicle, stop a vehicle, or maintain a vehicle in a stopped position by moving one or more brake pads into engagement with the brake rotor. The fixed caliper system may perform a service brake operation, a parking brake operation, or both. The fixed caliper system may comprise a brake caliper that fixedly attaches to a vehicle (e.g., by attaching the caliper, support bracket, or other member to a steering knuckle). The fixed brake system may operate in a convention manner known to those skilled in the art, with the exception of the additional novel and inventive support structure disclosed herein.

The fixed brake system may comprise one or more calipers. The one or more calipers may include one or more caliper bores each supporting one or more brake pistons on both sides of a brake rotor. One or more brake pads may be supported on the caliper on each of the inboard and outboard sides of the brake rotor. These may be the same brake pads used by the sliding brake system to create the clamping force, or they may be different brake pads than those used by the sliding brake system. The one or more brake pistons may be moved towards the brake rotor to move the one or more brake pads against the brake rotor to create a clamping force. The one or more brake pistons may be moved away from the brake rotor so that the one or more brake pads move away from the brake rotor to release a clamping force. The one or more brake pistons may be moved by pressurizing hydraulic fluid, via an electromechanical system (e.g., one or more rotary to linear stage mechanisms and one or more motors), or both The brake system may comprise a sliding brake system. The sliding brake system may function to decelerate a vehicle, stop a vehicle, or maintain a vehicle in a stopped position by moving one or more brake pads into engagement with the brake rotor. The sliding caliper system may perform a service brake operation, a parking brake operation, or both. The sliding caliper system may comprise a brake caliper that fixedly attaches to a vehicle (e.g., by attaching the caliper, support bracket, or other member to a steering knuckle). The sliding brake system may operate in a convention manner known to those skilled in the art, with the exception of the additional novel and inventive support structure disclosed herein.

The sliding brake system may comprise one or more calipers. The one or more calipers may include one or more caliper bores each supporting one or more brake pistons on one side of a brake rotor. For example, the one or more caliper bores and brake pistons may be arranged on the inboard side of the brake caliper and/or brake rotor or on the outboard side of the brake caliper or rotor. One or more brake pads may be supported on the caliper on each of the inboard and outboard sides of the brake rotor. These may be the same brake pads used by the fixed brake system to create the clamping force, or they may be different brake pads than those used by the fixed brake system.

The sliding brake system has one or more moving bodies. The one or more moving bodies may move or slide during a brake apply. The one or more moving bodies have an inboard portion, an outboard portion that may include a claw and/or one or more fingers, and a bridge connecting the two portions. The outboard portion, the claw, and/or the fingers are arranged adjacent to a brake pad. During a brake apply, a reaction force is generated when the brake pistons are moved, which causes the moving body (e.g., the inboard portion, the bridge, the outboard portion, the claw, the fingers, or a combination thereof) to move or slide. This movement or sliding functions to draw or pull the opposing brake pad into contact with the opposing side of the brake rotor to generate the clamping force.

The moving body or other portion of the sliding brake system may include one or more support structures or parts or components of the one or more support structures.

The brake system may include one or more support structures. A support structure may function to guide, carry, reinforce, bolster, stabilize, and/or support the moving body. A support structure may function to guide, carry, reinforce, bolster, stabilize, and/or support the moving body during movement of the brake system, the sliding brake system, the moving body, or a combination thereof during creation and/or release of the clamping force during a parking and/or service braking operation.

A support structure may include two or more complementary or mating parts or components. For example, a support structure may comprise a projection received into and/or movable within or relative to a slot or bore.

A part or component of the support structure may be connected, attached to, or part of the moving body. For example, a part or component of the support structure may be connected, attached to, or part of the moving body, the outboard portion, the inboard portion, the claw, the one or more fingers, or a combination thereof.

Another part or component of the support structure may be connected, attached to, or part of another feature or element of the brake system or vehicle that the moving body is configured to move or slide relative to. For example, another part or component of the support structure may be connected, attached to, or part of the caliper, fixed caliper system, support bracket, or a portion of the vehicle such as a knuckle.

A part or component of the support structure may extend from an outboard side of the brake caliper towards a brake rotor, or from an outboard side of the brake caliper away from a brake rotor. A part or component of the support structure may extend from an inboard side of the brake caliper towards a brake rotor, or from an outboard side of the brake caliper away from a brake rotor.

A part or component of the support structure may extend along an axis that is generally perpendicular to a face or side of the brake rotor. A part or component of the support structure may extend along an axis that is at an angle other than perpendicular to a face or side of the brake rotor.

A support structure (or part or component of the support structure) may be located at or near a leading end of the brake system or caliper, at or near a trailing end of the brake system or caliper, in a central region at or near a center of the brake system or caliper, or a combination thereof.

A support structure (or part or component of the support structure) may comprise: one or more projections, pins, extensions, bores, slots, apertures, bearings, linear bearings, biasing members or springs, bushings, projections, a screw or bolt, a nut or other threaded member, or a combination thereof. A support structure may include a ball nut assembly.

A support structure (or part or component of the support structure) may comprise a telescoping member that retracts in length and extends in length during movement of the moving body.

A support structure (or part or component of the support structure) may be made of a rigid material; a soft pliable and/or deformable material; a compressible material; an elastic material; or a combination thereof.

A support structure (or part or component of the support structure) may include one or more anti-rotation features that restrict or prevent rotational movement but allow or provide for linear movement. An anti-rotation feature may include one or more flat or planar surfaces defined on the projection, bore, or both. An anti-rotation feature may include one or undercuts or other non-round shapes or surfaces defined on the projection, bore, or both.

A support structure (or part or component of the support structure) may extend through at least a portion of the moving body and engage or connect to the brake pad or pressure plate. In other words, the support structure (or part or component thereof), the projection, the slot, or a combination thereof may be attached to or formed with the pressure plate. This may provide for the brake pad, the corresponding pressure plate, and the moving member to be slidably connected to a stationary part of the brake system or vehicle. In some configurations, the support structure (or part or component of the support structure) may be free of any connection or contact with the brake pad and/or pressure plate.

A support structure (or part or component of the support structure) may be two or more, three or more, four or more, five or more, etc. support structures, parts, or components. In fact, it is envisioned that the brake system may include any number of support structures.

The brake system, sliding brake system, fixed brake system, or a combination thereof may include one or more rotary to linear mechanisms. A rotary to linear mechanism may function to receive a torque (i.e., rotational force) and transfer the torque into an axial force (i.e., linear force). The rotary to linear stage mechanism may be a spindle and a nut, a lead screw and a nut, a ball screw and a nut, a ball and ramp assembly, or any combination thereof. The rotary to linear stage mechanism may move a brake piston so that the brake piston moves a brake pad.

The rotary to linear stage mechanism may include a spindle and a nut. The spindle may, be coupled to the motor. The spindle may be coupled directly to an output of the motor, or indirectly via one or more gears, gear trains, or other transfer mechanisms. The torque of the motor may axially rotate the spindle in a clockwise direction or a counterclockwise direction. The nut may be removably coupled (e.g., threaded onto) the spindle. Rotation of the spindle causes the nut to move axially. The nut is restricted or prevented from rotating relative to the spindle and/or brake piston.

The rotary to linear stage mechanism may include a spindle engaging a brake piston, without the use of a nut. In such a configuration, the brake piston may be restricted or prevented from rotating in the caliper bore. The spindle may threadably engage the brake piston. Accordingly, rotation of the spindle causes the brake piston to move axially.

The brake system, the fixed brake system, and/or the sliding brake system may include one or more motors. The motor may be configured to generate, provide, and/or transmit to torque to one or more rotary to linear stage mechanism and cause the rotary to linear stage mechanism to rotate. The motor may actuate, turn-on, or begin a brake operation, whether service brake, parking brake, or both. The torque may cause to move, directly or indirectly, the rotary to linear stage mechanism, the brake pistons, the bridge, the fingers, the brake pads, or any combination thereof. The motor may be attached to the sliding caliper system, the fixed brake system, the brake system, or a combination thereof. The motor may be attached to a remote location on the vehicle (e.g., the knuckle or chassis of the vehicle). The motor may be activated on-demand when a user (e.g., a driver) wishes to operate the service brake operation, the parking brake operation, or both. The motor may be activated automatically to perform a parking brake operation when a vehicle is stopped, put in park, turned OFF, or any combination thereof. The motor may be activated automatically to disengage the parking brake operation when a vehicle is in gear and/or turned ON.

The brake system may include one or more brake pistons. The brake pistons may function to move a brake pad, or a corresponding end of the brake pad, towards the brake rotor to create the clamping force.

The one or more brake pistons may be caused to move to generate a clamping force during a service brake operation, a parking brake operation, or both. For example, during a service brake operation and/or a parking brake operation, one or more brake pistons may be moved axially by pressurizing a hydraulic fluid (e.g., brake fluid) and/or one or more other brake pistons may be moved axially by a rotary to linear stage mechanism connected to a motor or gear train.

The one or more brake pistons may be components of the fixed brake system, the sliding brake system, the brake system, or a combination thereof. For example, in one envisioned system, two or more brake pistons may be caused to move by a hydraulic brake system (i.e., the fixed brake system) and one or more brake pistons may be caused to move by an electromechanical system (i.e., the sliding brake system). In other systems, two or more brake pistons may be caused to move by an electromechanical system (i.e., the fixed brake system), and one or more brake pistons may be caused to move by a hydraulic system (i.e., the sliding brake system). In yet other systems, all brake pistons may be moved by electromechanical systems, or all brake pistons may be moved by hydraulic systems.

One or more of the brake pistons may include a piston bore. The piston bore may define the open end of the brake piston. The piston bore may function to receive at least a portion of the sliding brake system (e.g., the electromechanical system, the rotary to linear stage mechanism, the spindle and/or the nut).

The brake system, the fixed brake system, the sliding brake system, or a combination thereof may include one or more brake pads. The one or more brake pads may include a friction portion and a pressure plate. The brake pads may be supported on the brake system or caliper so that the friction portion faces a side of the brake rotor. The pressure plate may oppose the friction surface.

The brake system, the fixed brake system, the sliding brake system, or a combination thereof may include one or more inboard brake pads; one or more outboard brake pads; or a combination thereof. For example, there may be one or more (i.e., at least one) inboard brake pad; one or more (i.e., at least one) outboard brake pad; or a combination there of. In other words, there may be one inboard brake pad, or there may be two or more, three or more, four or more, five or more, etc. inboard brake pads. In other words, there may be one outboard brake pad, or there may be two or more, three or more, four or more, five or more, etc. outboard brake pads.

One or more brake pistons; fingers; or both may face and/or may be in communication with (i.e., directly physically interact with) the pressure plates of a corresponding brake pad. The brake pistons, the fingers, or both may face and/or be in communication with ends (e.g., a leading end and a trailing end) of the brake pads, a central portion or a substantially central portion of the brake pads, or both. The brake pistons may be in contact with the pressure plate of an inboard brake pad, the brake pistons may be in contact with an outboard brake pad, the fingers may be in contact with the pressure plate of an inboard brake pad, the fingers may be in contact with the pressure plate of an outboard brake pad, or any combination thereof.

During a service brake operation and/or during a parking brake operation, the brake pistons and/or the fingers may push, pull, or otherwise move all or an end of a corresponding brake pad so that the corresponding friction material engages a corresponding side of the brake rotor to create a clamping force. The brake pads may be moved via a hydraulic system, an electromechanical system, or both. For example, the inboard brake pad may be moved with at least one brake piston moved with the hydraulic brake system and at least one brake piston moved with the electromechanical system; the outboard brake pad may be moved with at least one brake piston moved with the hydraulic brake system and at least one finger moved by the electromechanical brake system; or vice versa.

The present teachings are directed to a brake system and/or method of operating a brake system during a braking operation. The braking operation may be during a service brake operation and/or during a parking brake operation. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application provides examples of one or more elements of the brake system and components thereof. It is understood that one or more of these elements may be duplicated, eliminated, and/or combined with one or more other elements disclosed herein. Several elements described herein that are not necessarily illustrated in the Figures. These elements are still part of the disclosure and may be added to, duplicated, eliminated, and/or combined with one or more other elements disclosed herein.

It is understood that the method steps can be performed in virtually any order. Moreover, one or more of the following method steps can be combined with other steps; can be omitted or eliminated; can be repeated; and/or can separated into individual or additional steps.

Figure 1:
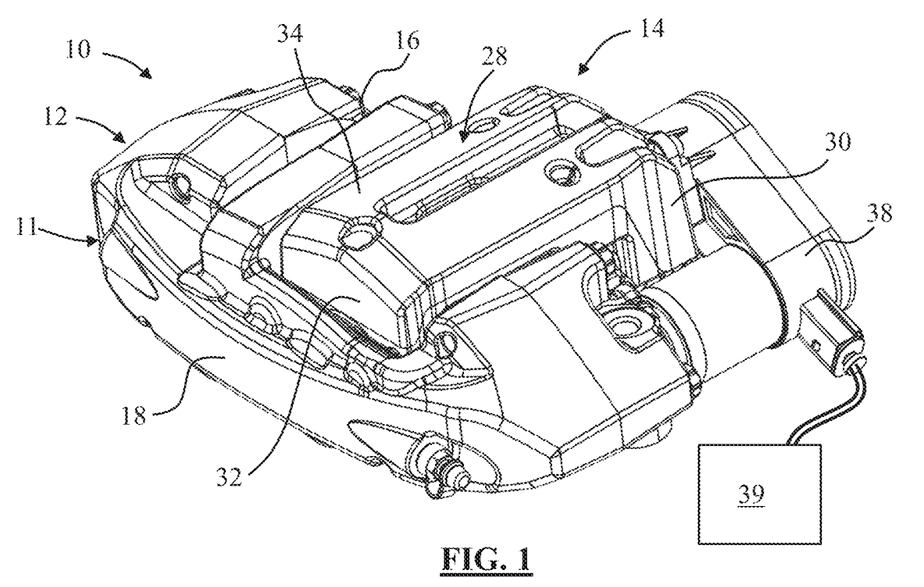
FIG. 1 is a perspective view of a brake system according to these teachings.
Figure 2:
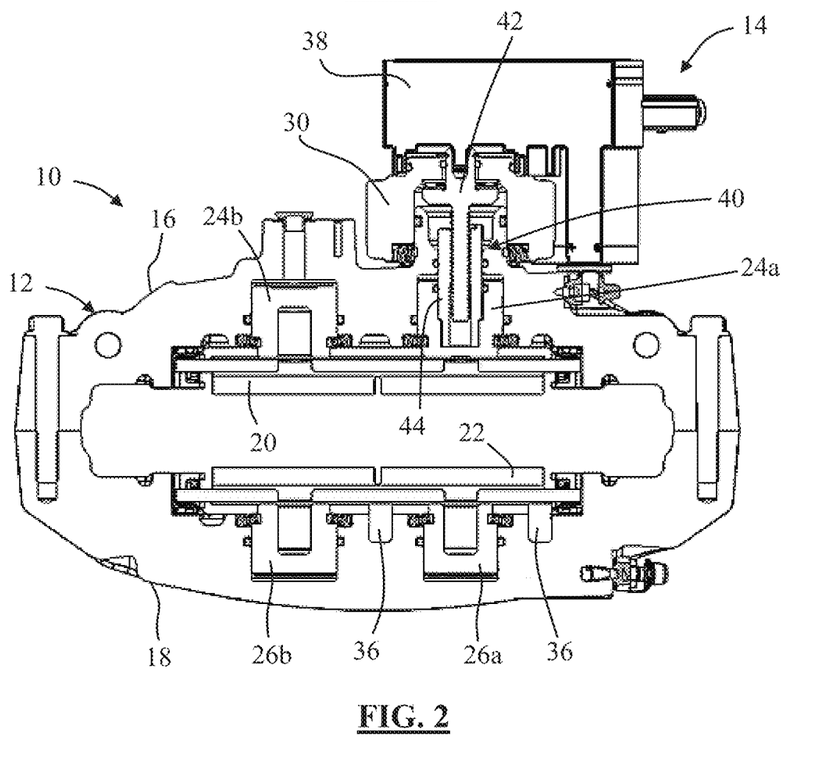
FIG. 2 is a top section view of the brake system.

FIGS. 1 and 2 illustrate a brake system 10. The brake system 10 comprises a fixed brake system 12 and a sliding brake system 14.

The brake system 10, the fixed brake system 12, and/or the sliding brake system 14 comprise a caliper 11. The caliper 11 has an inboard side 16 and an outboard side 18. Inboard refers to the surfaces, features, components, and/or elements of the brake system 10, the fixed brake system 12, and/or the sliding brake system 14 that are located closest to or face a center line of the vehicle. Outboard refers to the surfaces, features, components, and/or elements of the brake system 10, the fixed brake system 12, and/or the sliding brake system 14 that face a user standing outside of the vehicle or is/are located farthest from a center line of the vehicle.

The brake system 10 includes an inboard brake pad 20 and an opposing outboard brake pad 22. A brake rotor (not illustrated) is arranged between the friction portions of the two brake pads 20, 22.

The brake system 10 and/or caliper 11 includes one or more brake pistons supported in respective caliper bores at the inboard side 16 of the caliper 11 and one or more brake pistons supported in respective caliper bores at the outboard side 18 of the caliper 11. The brake system 10 illustrated at FIG. 2 includes two brake pistons 24a, 24b at the inboard side 16 and two brake pistons 26a, 26b at the outboard side 18. However, each side 16, 18 may include any number of brake pistons. For example, the same number of brake pistons may be located on both sides 16, 18. However, in other configurations, a different number of brake pistons may be located on each of the sides 16, 18.

One or more of the brake pistons may be part of the fixed brake system 12 and one or more of the brake pistons may be part of the sliding brake system 14. In other words, one or more of the brake pistons may be used by only the fixed brake system 12 to generate a clamping force during a braking operation and one or more of the brake pistons may be used by only the sliding brake system 14 to generate a clamping force during another braking operation. One or more of the brake pistons may be part of both brake systems 12, 14. In other words, one or more of the brake pistons may be used by the fixed brake system 12 to generate a clamping force during a braking operation and also by the sliding brake system 14 to generate a clamping force during another braking operation.

By moving one or more of the brake pistons at the inboard side 16 and one or more brake pistons at the outboard side 18, the brake system 10 and/or the fixed brake system 12 is operable to move the corresponding inboard and outboard brake pads 20, 22 against the brake rotor to generate a first clamping force. One or more of the brake pistons may be moved by the fixed system 12 by pressurizing hydraulic fluid, via one or more electromechanical mechanisms (i.e., a motor and a rotary to linear stage mechanism described below with respect to the sliding brake system), or both. The first clamping force may be generated to slow, stop, or restrict the braking disc and/or a road wheel from moving during a service brake operation and/or a parking brake operation.

The brake system 10 and/or the sliding brake system 14 comprises a moving body 28. The moving body 28 has an inboard portion 30, an outboard portion 32, and a bridge 34 extending therebetween. Two or more of the portions 30, 32, 34 may be discrete pieces connected together with one or more suitable fasteners or adhesives. Alternatively, the portions 30, 32, 34 may be a single, integral member.

The outboard portion 32 of the sliding member 30 includes one or more fingers 36. The outboard portion 32 may also be referred to as a claw. The outboard portion 32 or claw may include any number of fingers 36. The fingers 36 are arranged adjacent to and operable to engage the outboard brake pad 22. However, it is within the scope of this disclosure that the fingers 36 can be flipped to the other side of the caliper 11 and engage the inboard brake pad 20. In such a configuration, the inboard portion 30 becomes the outboard portion; and the outboard portion 32 becomes the inboard portion. Moreover, it is within the scope of this disclosure that the fingers 36 may engage the brake pad at the leading end of the brake pad, a trailing end of the brake pad, in a central region of the brake pad; or at both the leading and trailing ends.

The brake system 10 and/or the sliding brake system 14 comprises a motor 38 and one or more rotary to linear stage mechanisms 40. The motor 38 can be electrically connected to a controller 39 and to the rotary to linear stage mechanism 40. The controller 39 may be electrically connected to a power supply, for example, a vehicle battery or any other power supply like an alternator. The controller 39 may include sufficient control logic that is operable to actuate the brake system, the fixed brake system, the sliding brake system, or a combination thereof to generate the clamping force and/or to release the clamping force, The rotary to linear stage mechanism 40 comprises a spindle 42 and a nut 44. The rotary to linear stage mechanism 40 is illustrated as associating with brake piston 24a. However, it is understood that the rotary to liner stage mechanism 40 may be associated with one or more of any of the other brake pistons on the inboard and/or outboard side 16, 18 of the brake system 10 or caliper 11. Associated means that the rotary to linear stage mechanism 40 may be operable to move the respective brake piston during a braking operation to apply to release a clamping force.

One or more of the brake pistons may be moved by the brake system 10 and/or sliding brake system 12 by pressurizing hydraulic fluid, via one or more electromechanical mechanisms (i.e., a motor and a rotary to linear stage mechanism), or a combination thereof. More specifically, the motor 38 is configured to generate torque. The torque can be transferred directly, or indirectly (i.e., via one or more gear trains and/or other torque transferring mechanisms) to the spindle 42, which causes the spindle 42 to rotate. The nut 44 is connected to the spindle 42 such that rotation of the spindle 42 causes the nut 44 to move or translate axially along a length of the spindle 42. Axial movement of the nut 44 is operable to move the brake piston it is associated with (i.e., brake piston 24a in the illustrated example) against the inboard brake pad 20 and then move the brake pad 20 against the brake rotor. A reaction force is then generated, which causes the moving body 28 to move in an opposite direction, thus pulling the outboard brake pad 22 via the outboard portion 32 or claw and/or fingers 36 against the opposite side of the braking disc to generate a second clamping force. The second clamping force may be generated to slow, stop, or restrict the braking disc and/or a road wheel from moving. The second clamping force may be applied during a service brake operation and/or a parking brake operation.

Figure 3:
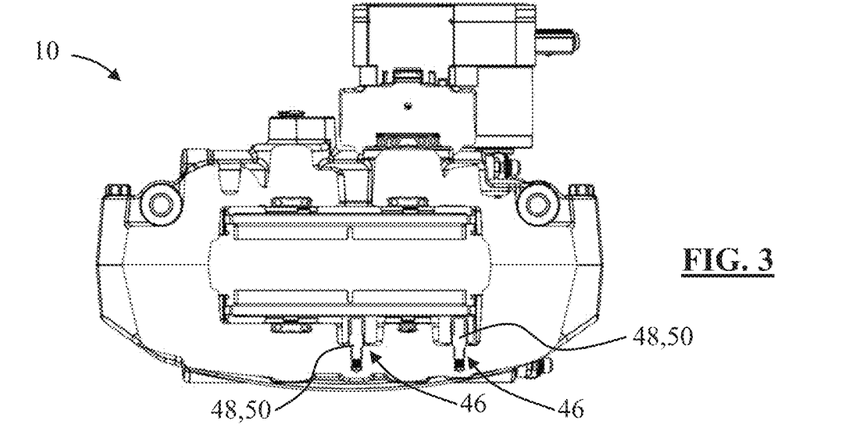
FIG. 3 is another top section view of the brake system.
Figure 4:
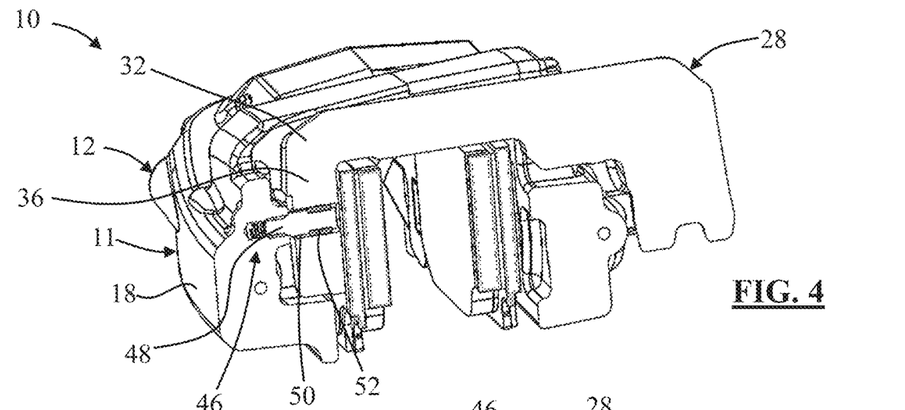
FIG. 4 is a perspective section view of the brake system.
Figure 5:
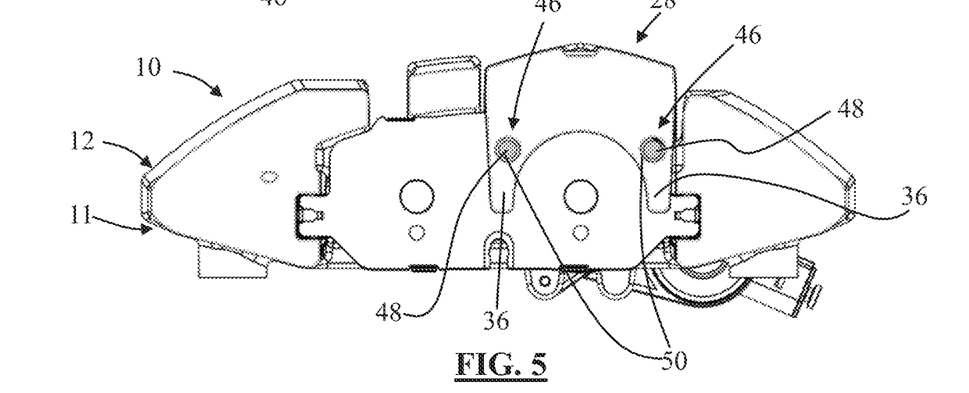
FIG. 5 is a side section view of the brake system.

FIGS. 3-5 illustrate the brake system 10. The brake system 10 includes one or more support structures 46. Two support structures 46 are shown in FIGS. 3 and 5.

The support structure 46 is operable to guide, carry, reinforce, bolster, stabilize, support, and/or provide a sliding contact between the sliding brake system 14 and the fixed brake system 12. More specifically, the moving body 28 is guided, carried, reinforced, bolstered, stabilized, and/or supported by way of the support structure 46 during movement of the moving body 28 relative to the caliper 11 and/or fixed system 12 during a brake apply and/or a brake retract. The support structure 46 is located in a region of the outboard side 18 of the brake system 10, 12 or caliper 11.

The support structure 46 may comprise one or more parts or components. For example, the support structure 46 may include one or more projections 48 and one or more mating or complementary slots 50. During movement of the sliding brake system 14 and/or the moving body 28, the one or more projections 48 may be configured to slide, be in sliding contact with, or otherwise move within or relative to the one or more slots 50. This may assist with supporting the outboard portion 32 or claw and/or the fingers 36 so that the moving body 28 does not twist, jam, bind or otherwise move along an unintended path during a brake apply and/or a brake retract.

In one configuration, the one or more projections 48 may be fixed to or extend from the outboard side 18 of the brake system 10, 12 or caliper 11, and the one or more slots 50 may be defined in the sliding brake system 14, the moving body 28, the outboard portion 32, the fingers 36 or a combination thereof, in such a configuration, the one or more projections 48 face or extend in a direction of the brake rotor. The one or more slots 50 may extend through an entire thickness of the outboard portion 32 or claw and/or fingers 36, or the one or more slots 50 may be located in only an outside region of the outboard portion 32 or claw and/or fingers 36 and be free from extending to an inside region that contacts the pressure plate of the outboard brake pad.

In other configurations, the one or more slots 50 may be defined in the outboard side 18 of the brake system 10, 12 or caliper 11, and the one or more projections 48 may be fixed to or extend from the sliding brake system 14, the moving body 28, the outboard portion 32, the fingers 36 or a combination thereof. In such a configuration, the one or more projections 48 face or extend in a direction away from the brake rotor. In some configurations, the projection 48 may be connected to or on in contact with the pressure plate of the outboard brake pad. In some other configurations, the projection 48 may be free from or not connected and/or not in contact with the pressure plate of the outboard brake pad.

The support structure 46, the one or more projections 48, and/or the one or more slots 50 may be located in a region of the outboard member 32 or claw, the one or more of the fingers 36, or both.

The one or more projections 48 may be a pin, a boss, a flange, a linear bearing, a bearing, a tapered pin, or any like projecting or extending feature. The one or more projections 48 may have any suitable shape or cross-section that complements the shape or cross section of the slot 50. The one or more projections 48 may have a circular, round, or oval cross section or shape. The one or more projections 48 may have a non-circular or non-round cross section or shape (e.g., triangular shaped, star shaped, etc.). The one or more projections 48 may have a square or rectangle cross section. For example, the one or more projections 48 may have one or more flat sides or planar features. These flat or planar features may also function as an anti-rotation feature to restrict or prevent the projection 48 from rotating or sliding in the slot 50.

The one or more slots 50 may be an aperture, hole, absence of material, pocket, recess, or other feature defined in the caliper 11 or fixed system 12 that a moving projection 48 (by way of movement of the moving body 30) can move or slide relative to or into. In contrast, if the one or more slots are defined in the moving body 30, then the one or more slots 50 may move or slide relative to a stationary projection 48 extending from the caliper 11 or fixed system 12.

A bushing, bearing, or other guiding member 52 may be provided between one or more of the projections 48 and slots 50. The bushing, bearing, or other guiding member 52 may function to help guide the sliding contact between the projection and slot and/or reduce friction therebetween. The guiding member 52 may include a lubricant to reduce friction between the components of the supporting structure 46.

Any description and/or illustration relating to the support structure, projection, slot, or a combination thereof may apply to all examples relating to the support structure.

Figure 6:
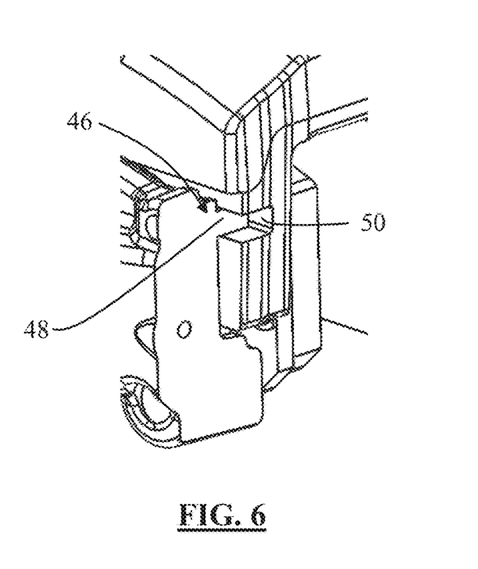
FIG. 6 is a partial close up view of a portion of the brake system.
Figure 7:
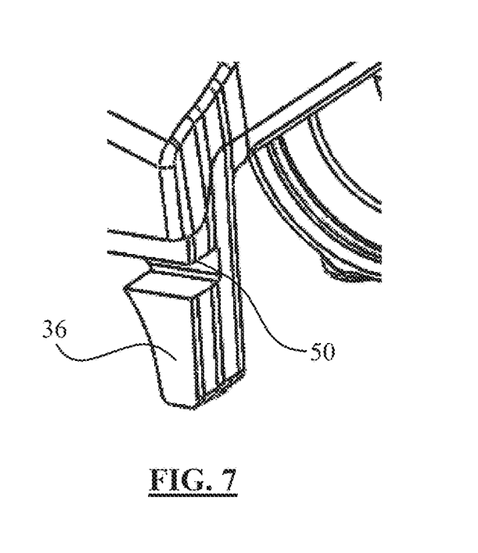
FIG. 7 is a partial close up view of a portion of the brake system.

FIGS. 6-7 illustrate a support structure 46 comprising a projection 48 and slot 50. The slot 50 is defined in an outside surface of the one or more of the fingers 36. In other words, the slot 50 is defined in an outside portion of the one or more fingers 36 that opposes an inside portion of the one or more fingers 36 that contact the pressure plate of the outboard brake pad to move the brake pad during a brake apply. The slot 50 has a generally rectangular shape and the projection 48 has a corresponding rectangular profile. The rectangular shapes/profiles may assist with restricting or prevent rotation of the moving body 28 relative to the caliper and/or systems 10, 12.

Figure 8:
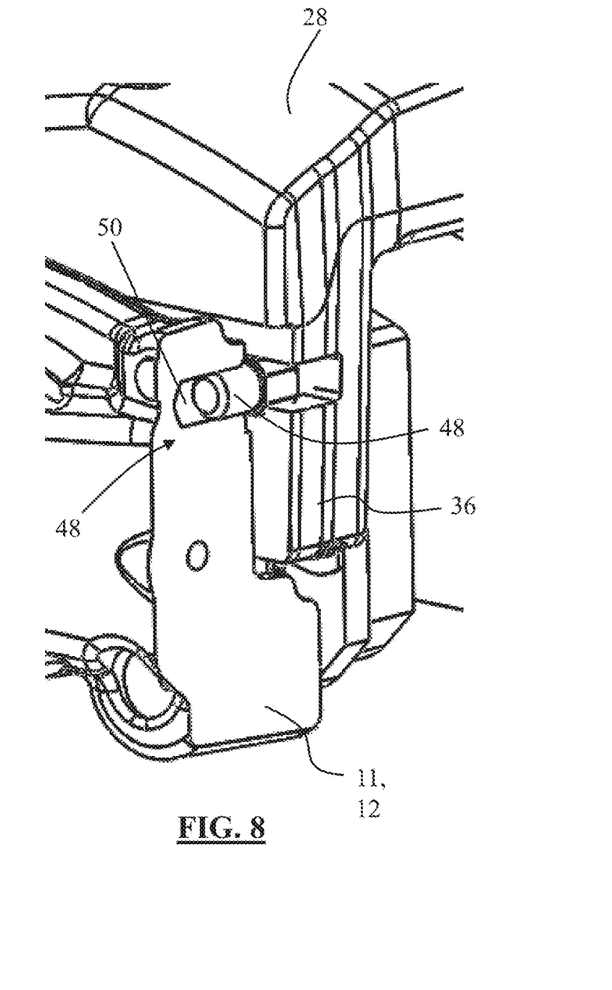
FIG. 8 is a partial close up view of a portion of the brake system.

FIG. 8 illustrates a support structure 46 which comprises a projection 48 and slot 50. The projection 48 and slot 50 both have a generally round shape or cross section. The projection 48 is fixed to the moving body 20 or finger 36 and the slot 50 is defined in the fixed caliper system 12 or caliper 11.

Figure 9:
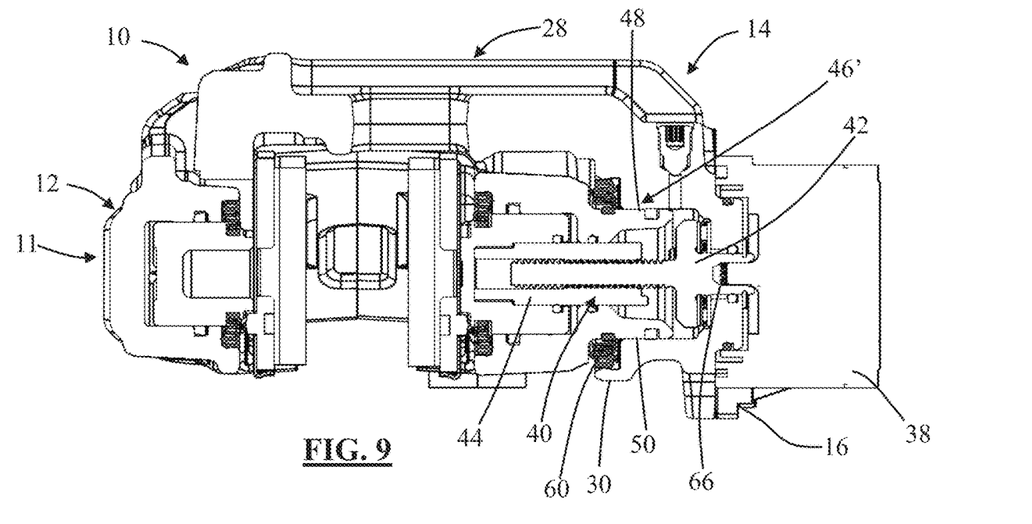
FIG. 9 is a front section view of the brake system.

FIG. 9 illustrates a brake system 10 that includes one or more of the features illustrated and described above at FIG. 1, including a caliper 11, a fixed brake system 12 and a sliding brake system 14.

The brake system 10 includes a support structure 46' located at the inboard side 16. The support structure 46' comprises a projection 48 and slot 50, further illustrated at FIGS. 10 and 11, respectively. This support structure 46' may have a structure and function that is similar to that of the support structure 46. Thus, the description of the support structure 46 may apply to the support structure 46' and vice versa. A brake system 10 may include support structure 46 and/or support structure 46'.

The projection 48 extends from the inboard side 16 of the caliper 11 and surrounds at least a portion of the rotary to linear stage mechanism 40. That is, a portion of the spindle 42 and the nut 44 are contained within an inner portion or bore defined in the projection 48.

Figure 10:
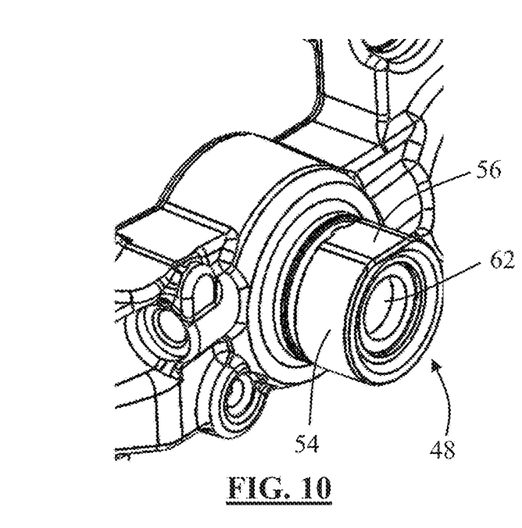
FIG. 10 is a partial close up view of a portion of the brake system.

Referring to FIG. 10, the projection 48 has an outer surface 54. The outer surface 54 or profile has a generally circular shape or cross section. The outer surface 54 also has an anti-rotation feature 56. The anti-rotation feature 56 is one or more flat or planar surfaces.

Figure 11:
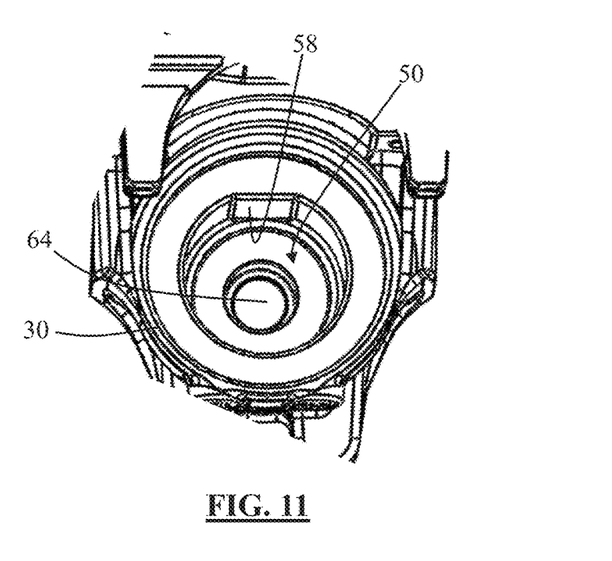
FIG. 11 is a partial close up view of a portion of the brake system.

Referring now to FIG. 11, the slot 50 is a bore or opening defined in the inboard portion 30 of the moving body 28. The slot 50 has a size and shape that corresponds to a size and shape of the projection 48. This means the slot 50 is adapted to slide over or onto the projection 48 and have a sliding contact on or with the outer surface 54 of the projection 48. The slot 50 has an anti-rotation feature 58. The anti-rotation feature 58 corresponds to the anti-rotation feature 56 defined on the projection 48. The anti-rotation feature 58 is a flat or planar surface. A seal or boot 60 (FIG. 9) may be provided between the projection 48 and slot 50. The seal or boot 60 may function to restrict or prevent dust, debris, liquids, and the like from entering the area between the projection 48 and slot 50, which may obstruct, damage, or otherwise interfere with the sliding contact between the projection 48 and slot 50. The projection 48 and slot 50 may each include a respective aperture 62, 64, through which an input portion 66 of the spindle 42 and/or an output portion 66 of the motor 38 extend to connect together the motor 38 and the rotary to linear stage mechanism 40.

Figure 12:
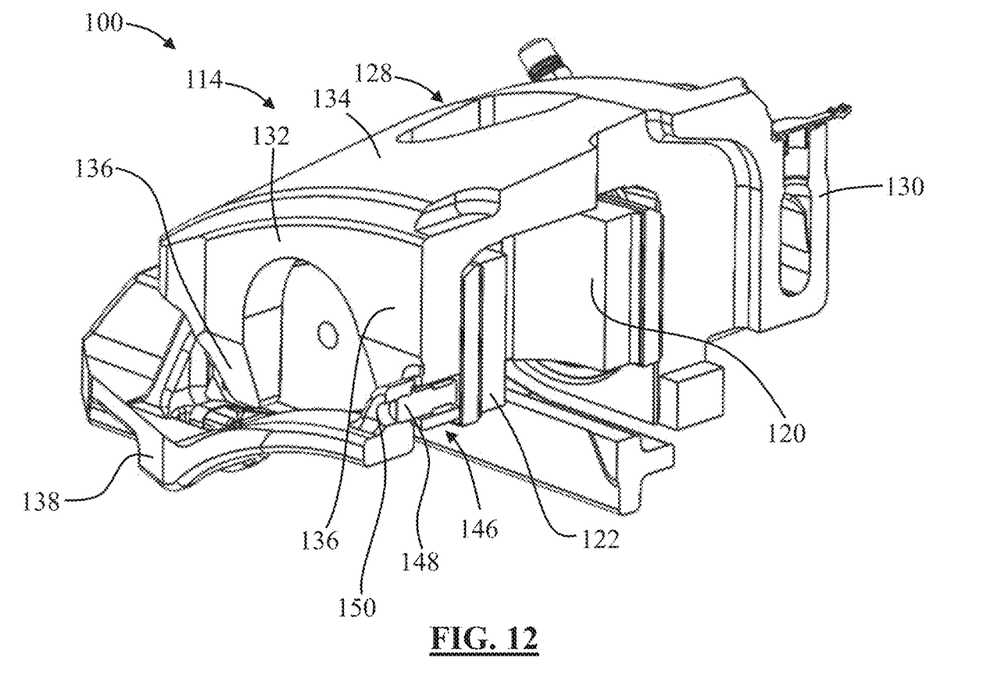
FIG. 12 is a perspective view of a brake system according to these teachings.

FIG. 12 illustrates another brake system 100. The brake system 100 is a sliding brake system 114 that includes a moving body 128. The moving body 128 has an inboard portion 130, an outboard portion 132, and a bridge 134 extending therebetween. The outboard portion 132 includes one or more fingers 136. The fingers 136 are arranged adjacent to and operable to engage an outboard brake pad 122. However, it is within the scope of this disclosure that the fingers 136 can be flipped to engage an opposing inboard brake pad 120. In such a configuration, the inboard portion 130 becomes the outboard portion, and the outboard portion 132 becomes the inboard portion. The sliding brake system 114 comprises a support bracket 138 for connecting the brake system 100 to a stationary part of a vehicle, such as a knuckle. The brake system 100 comprises one or more brake pistons at the inboard side of the brake system 100.

Figure 13:
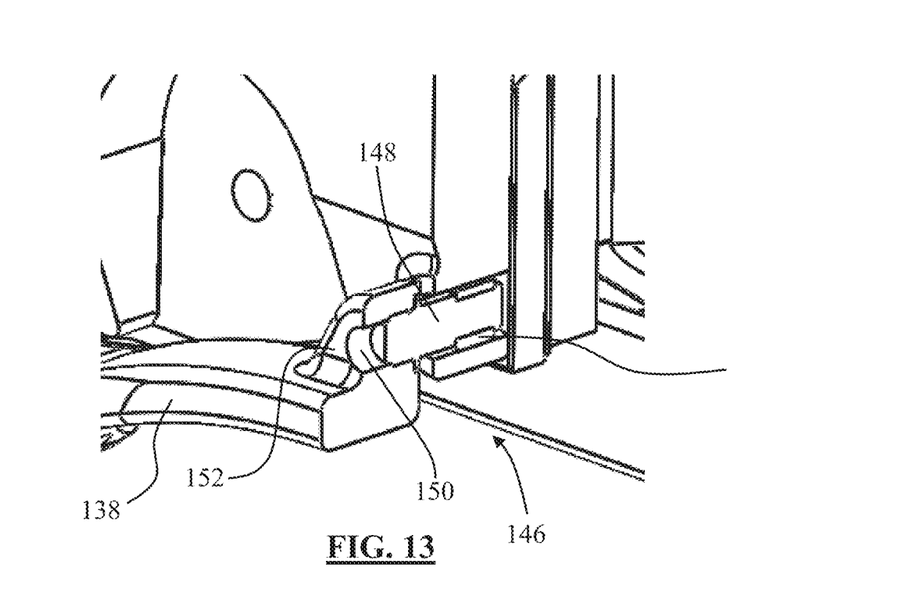
FIG. 13 is a partial close up view of a portion of the brake system of FIG. 12.

The brake system 100 comprises a support structure 146. The support structure 146 may be similar in structure and function to the support structure described above at 46 and 46'. A brake system 10, 100 may include any one of the support structures described herein, including support structure 46, 46' and 146.

The support structure 146 is operable to carry, hold, contact, provide support, and/or provide a sliding contact between the moving body 28 and the support bracket 138 or any other non-moving component of the brake system 100 or vehicle that includes the brake system during a brake apply and/or a brake retract. The support structure 146 is located in a region of the outboard side of the brake system 100, 114.

The support structure 146 may comprise one or more projections 148 and one or more slots 150. During movement of the sliding brake system 114 and/or the moving body 128, the one or more projections 148 may be configured to slide or move within and/or relative to the one or more slots 150. This may assist with supporting the outboard portion 132 and/or the fingers 136 so that the moving body 218 does not twist, jam, bind, or otherwise move along an unintended path. The projection 148 may or may not be connected, attached, or in contact with the outboard brake pad 122.

The one or more projections 148 may extend from the outboard portion 132, the one or more fingers 136, or both and the one or more slots 150 may be defined on the support bracket 138, or vice versa. The one or more slots 150 may be located or defined in a flange or bracket 152 extending from the support bracket 138.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

The invention claimed is:

1. A brake system comprising:
a fixed brake system having an inboard side and an outboard side, and operable to move an inboard brake pad and/or an outboard brake pad against a brake rotor to generate a first clamping force;
a sliding brake system operable to move relative to the fixed brake system and to move the same inboard brake pad and/or the same outboard brake pad against the brake rotor to generate a second clamping force, the sliding brake system having an outboard portion that is configured to pull the outboard brake pad against the brake rotor to generate the second clamping force, the outboard portion includes an aperture; and
a support structure providing a sliding contact between the sliding brake system and the fixed brake system during movement of the sliding brake system relative to the fixed brake system,
wherein the support structure has a length that extends from the outboard side of the fixed brake system in an inwardly direction towards the inboard side of the fixed brake system, the support structure is oriented and dimensioned to engage the aperture defined in the outboard portion of the sliding brake system.

2. The brake system according to claim 1, wherein the brake system comprises a motor and a rotary to linear stage mechanism, which comprises a spindle and a nut,
wherein the brake system comprises a second support structure providing a second sliding contact between the sliding brake system and the fixed brake system, wherein the second support structure is located in a region of the inboard side of the fixed brake system and surrounds at least a portion of the rotary to linear stage mechanism.

3. The brake system according to claim 2, wherein the second support structure is located in a region of the fixed caliper system that supports a brake piston.

4. The brake system according to claim 3, wherein the second support structure comprises an anti-rotation feature.

5. The brake system according to claim 2, wherein the second support structure comprises an aperture through which an input portion of the spindle and/or an output portion of the motor extend.

6. The brake system according to claim 1, wherein the outboard portion of the sliding brake system comprises a claw, the aperture is defined in the claw.

7. The brake system according to claim 1, wherein the brake system comprises a second support structure having a length that extends only partially from the outboard side of the fixed brake system in the inwardly direction towards the inboard side of the fixed brake system, the second support structure is oriented and dimensioned to engage a second aperture defined in the outboard portion of the sliding brake system.

8. The brake system according to claim 1, wherein the support structure, the aperture, or both have an anti-rotation feature, and wherein the outboard portion of the sliding brake system comprises a claw that comprises the aperture.

9. The brake system according to claim 1, wherein the support structure comprises a projection, a pin, and/or a bearing.

10. A brake system comprising:
   a fixed brake system having an inboard side and an outboard side and being operable to move an inboard brake pad and/or an outboard brake pad against a brake rotor to generate a first clamping force, the outboard side of the fixed brake system comprises an aperture;
   a sliding brake system comprising an outboard portion configured to move relative to the fixed brake system to generate a second clamping force, the outboard portion is arranged between the inboard side and the outboard side of the fixed brake system; and
   a support structure providing a sliding contact between the sliding brake system and the fixed brake system during movement of the sliding brake system relative to the fixed brake system;
   wherein the support structure comprises a length that extends outwardly from the outboard portion of the sliding brake system in a direction of the outboard side of the fixed brake system, and is oriented and dimensioned to engage the aperture defined in the outboard side of the fixed brake system.

11. The brake system according to claim 10, wherein the brake system comprises a second support structure having a length that extends outwardly from the outboard portion of the sliding brake system in the direction of the outboard side of the fixed brake system, and is oriented and dimensioned to engage a second aperture defined in the outboard side of the fixed brake system.

12. The brake system according to claim 11 wherein the outboard portion of the sliding brake system comprises a claw that comprises the aperture and the second aperture.

13. The brake system according to claim 12, wherein the second support structure comprises a projection, a pin, and/or a bearing.

14. The brake system according to claim 12, wherein the brake system comprises a motor and a rotary to linear stage mechanism, which comprises a spindle and a nut,
   wherein the brake system comprises a third support structure providing a third sliding contact between the sliding brake system and the fixed brake system during movement of the sliding brake system relative to the fixed brake,
   wherein the third support structure is located in a region of the inboard side of the fixed brake system and surrounds at least a portion of the rotary to linear stage mechanism.

15. The brake system according to claim 14, wherein the third support structure comprises an aperture through which an input portion of the spindle and/or an output portion of the motor extend to connect together the motor and the rotary to linear stage mechanism.

16. The brake system according to claim 10, wherein the brake system comprises a second support structure providing a second sliding contact between the sliding portion and the fixed brake system during movement of the sliding brake system relative to the fixed brake system,
   wherein the second support structure is located in a region of the inboard side of the fixed brake system.

17. The brake system according to claim 16, wherein the brake system comprises a motor and a rotary to linear stage mechanism, which comprises a spindle and a nut, the second support structure surrounds at least a portion of the rotary to linear stage mechanism.

18. The brake system according to claim 17, wherein the second support structure comprises an aperture through which an input portion of the spindle and/or an output portion of the motor extend to connect together the motor and the rotary to linear stage mechanism.

19. The brake system according to claim 10, wherein the outboard portion of the sliding brake system comprises a claw, the support structure extends from the claw, and wherein the support structure and/or the aperture do not extend all the way through the outboard side of the fixed brake system.

20. The brake system according to claim 10, wherein the support structure comprises a projection, a pin, and/or a bearing.

* * * * *